Patented Dec. 24, 1935

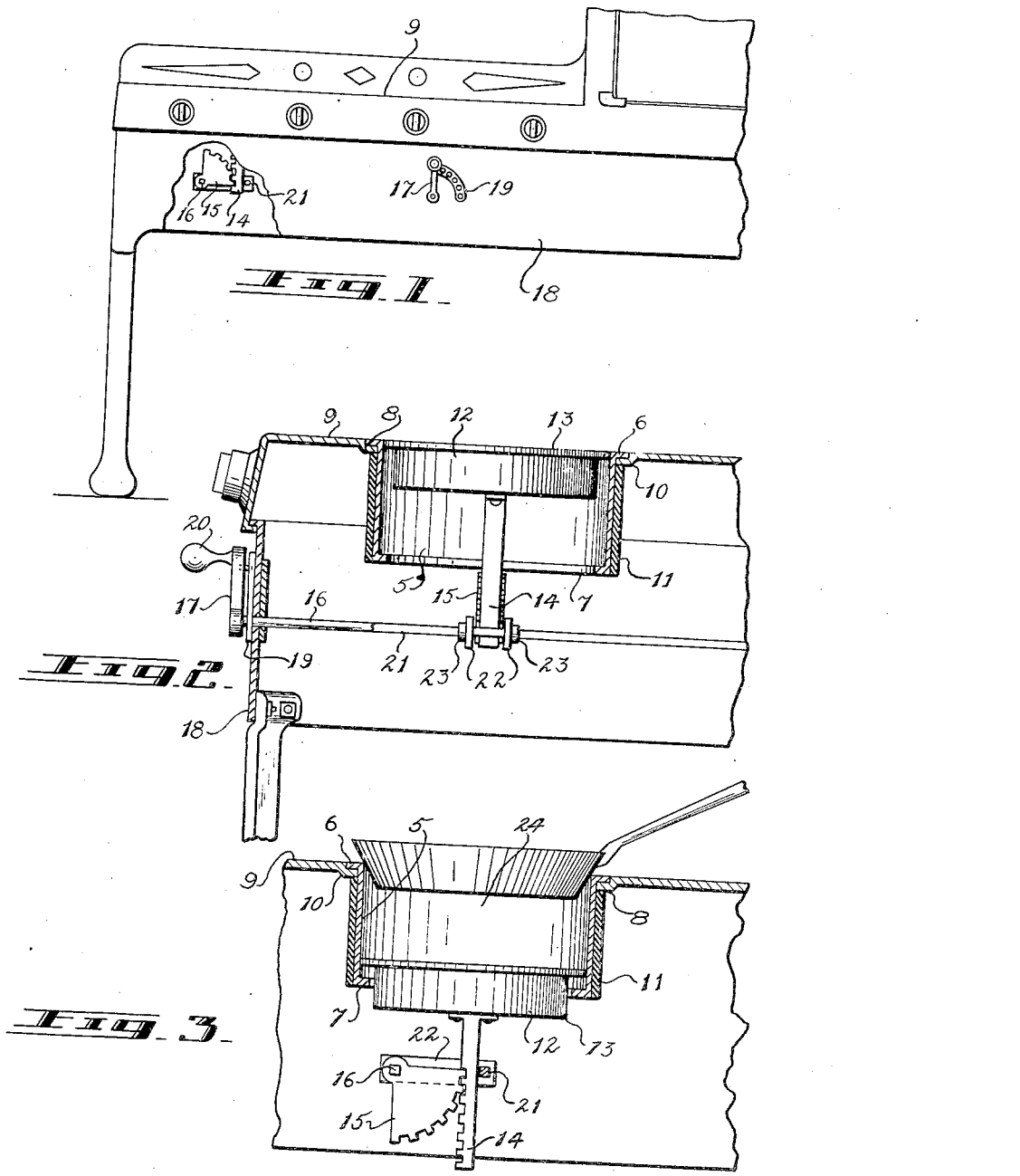

2,025,252

UNITED STATES PATENT OFFICE 2,025,252

STOVE

August John Stencell, Pembroke, Ontario, Canada

Application June 20, 1933, Serial No. 676,685

2 Claims. (Cl. 219—37)

This invention relates to improvements in a stove and appertains particularly to an electric stove and the manner of mounting the burner elements thereof.

The principal object of the invention is to provide an electric burner element that is adjustable to and away from the cooking utensil bottom to prevent scorching.

A further object of the invention is to provide a stove with a vertically adjustable burner element surrounded by a depending insulated sleeve or cylinder to encompass or hold in the heat between the burner element and the utensil bottom.

A further object of the invention is to provide an electric stove having a high speed resistance element adjustably mounted in a surrounding cylinder so that it may be dropped away from a utensil bottom so as to heat the same through a variable body of air.

A further object of the invention is to provide an electric stove having a high speed resistance element adjustably mounted in a surrounding cylinder so that the bottom of a superposed utensil may be evenly heated through the medium of a variable column of air.

A further object of the invention is to provide a stove wherein the bare resistance element may be brought into intimate contact with the utensil to be heated or separated therefrom by an insulated column of air of the desired extent.

A still further object of the invention is to provide an electric cook stove with a movable element of the nature and for the purpose described that is characterized by structural simplicity, efficiency, durability, versatility and low cost of production, being thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:—

Figure 1 is a front elevation of a conventional electric stove equipped with these vertically adjustable elements;

Figure 2 is a transverse vertical section through a part of the stove showing one possible manner of mounting the burner plate; and Figure 3 is a similar longitudinal vertical section.

With the high speed plates used in modern stoves the utensil is often scorched in lines corresponding with the pattern of the resistance wire in the burner plate, the intense heat being thus transmitted unevenly in which case it is desirable in the interests of even cooking and of careful regulation of the heat beyond the conventional "high", "medium" and "low" adjustments ordinarily provided to so mount the resistance element that it may be conveniently withdrawn from the utensil bottom as desired, allowing the heat generated to spread evenly and be conducted to the utensil bottom through an intermediate body of air of the desired extent. This overcomes the unfortunate concentration or focus of extremely high temperature in lines corresponding with the element pattern and, thus by the use of this variable air space, eliminates confinement to the limited adjustments allowed in the ordinary three-speed switch.

In this invention a cylinder 5 flanged outwardly as at 6, at the top, and with an inturned flange 7 at the bottom is sunk in an opening 8 in the stove top 9 with the flange 6 nested in a concentric depression 10 so that the upper side of the flange is flush with the stove top 9. A band 11 of asbestos or some similar insulation surrounds this cylinder formed well.

The burner plate 12 is of conventional construction with a fire clay disk for a body and a helically wound resistance wire sunk in the top thereof serving as the heating element. It has an exterior flange 13 around its top edge that just fits within the suspended cylinder 5 while the main body portion of the plate 12 is adapted to pass through the bottom of the cylinder that is constricted by the inturned flange 7 on which the burner plate flange 10 can rest.

From the underside of the burner plate 12 a toothed rack 14 depends and is engaged by a segmental gear 15 on a squared rod 16 having a manually operable crank arm 17 on its forward end exterior of the stove front 18. A pocketed segmental plate 19 coaxial with the rod 16 releasably receives a spring urged dog 20 in the inside of the crank arm 17 so that the gear 15 may be retained in any desired rotative position. A second rod 21 parallels the first rod 16 and is placed in the same horizontal plane, extending across the stove but on the other side of the toothed rack 14 from the gear 15 to hold the said rack and gear in engagement. A pair of side plates 22 extend across between these rods 16 and 21 one on each side of the engaging rack and gear and are retained in position by collars 23 or the rods on their outer sides holding said plates against separation or lateral displacement.

As the construction and design of one possible embodiment of the invention has been thus clearly set forth, it should suffice in conclusion to make but a brief reference to its use and modus operandi: whenever it is felt that the heat from the element is too intense or too concentrated for the cooking undertaken, the element in common with the assembled burner plate is lowered away from the bottom of the cooking utensil until the necessary intervening air space 24 is acquired through which the utensil is heated to the desired degree and evenly across the exposed area of its bottom by virtue of the equalizing effect of the intermediate heat conducting air body.

From the foregoing description taken in connection with the accompanying drawing, it will be manifest that a stove is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawing shall be interpreted as illustrative and not in a limitative or restrictive sense.

Having thus described the invention, what is claimed as new is:—

1. A stove having a top with an opening therein, an exteriorly flanged cylinder suspended in said opening by its flange, an interior flange on the bottom of said cylinder and a vertically adjustable burner plate in said cylinder confined by said latter flange.

2. A stove having a top with an opening therein, a concentric depression around said opening, an exteriorly flanged cylinder suspended in said opening by its flange nesting in said depression so that the top of said flange is flush with the top of the stove, an interior flange constricting the opening in the lower end of the cylinder, a burner plate exteriorly flanged at its upper edge adjustable in said cylinder so that it lies flush with the top of the stove in uppermost position and rests by its flange on the interior flange at the lower end of said cylinder in its lowermost position, and means for raising and lowering said burner plate.

AUGUST JOHN STENCELL. [L. S.]